(12) United States Patent
McConville et al.

(10) Patent No.: US 9,080,506 B2
(45) Date of Patent: Jul. 14, 2015

(54) METHODS AND SYSTEMS FOR BOOST CONTROL

(71) Applicant: Ford Global Technologies, LLC, Dearborn, MI (US)

(72) Inventors: Gregory Patrick McConville, Ann Arbor, MI (US); Julia Helen Buckland, Commerce Township, MI (US); Ralph Wayne Cunningham, Milan, MI (US); Brad Alan Boyer, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 13/965,938

(22) Filed: Aug. 13, 2013

(65) Prior Publication Data
US 2015/0047342 A1     Feb. 19, 2015

(51) Int. Cl.
| F02D 23/00 | (2006.01) |
| F02B 33/44 | (2006.01) |
| F02B 47/08 | (2006.01) |
| F02B 37/00 | (2006.01) |
| F02D 41/00 | (2006.01) |
| F02M 25/07 | (2006.01) |

(52) U.S. Cl.
CPC .............. *F02B 47/08* (2013.01); *F02B 37/00* (2013.01); *F02D 23/00* (2013.01); *F02D 41/005* (2013.01); *F02D 41/0007* (2013.01); *F02D 2250/34* (2013.01); *F02M 25/0707* (2013.01); *F02M 25/0709* (2013.01); *F02M 25/0713* (2013.01); *F02M 25/0732* (2013.01)

(58) Field of Classification Search
USPC .............. 60/598, 599, 602, 605.1, 605.2, 611
See application file for complete search history.

(56) References Cited

U.S. PATENT DOCUMENTS

| 3,614,259 | A |   | 10/1971 | Neff |
| 4,351,154 | A |   | 9/1982  | Richter |
| 4,389,845 | A | * | 6/1983  | Koike ............................ 60/602 |
| 4,443,153 | A |   | 4/1984  | Dibelius |
| 4,544,326 | A |   | 10/1985 | Nishiguchi et al. |
| 4,949,276 | A |   | 8/1990  | Staroselsky et al. |
| 5,180,278 | A | * | 1/1993  | Warner ........................... 415/27 |

(Continued)

FOREIGN PATENT DOCUMENTS

| EP | 0435357 A1 | 7/1991 |
| EP | 2317111 A1 | 5/2001 |

(Continued)

OTHER PUBLICATIONS

Ulrey, Joseph Norman et al., "Method and System for Fuel Vapor Management," U.S. Appl. No. 13/660,884, filed Oct. 25, 2012, 38 pages.

(Continued)

*Primary Examiner* — Audrey K Bradley
(74) *Attorney, Agent, or Firm* — Julia Voutyras; Alleman Hall McCoy Russell & Tuttle LLP

(57) ABSTRACT

Methods and systems are provided for coordinating adjustments to a compressor recirculation valve with adjustments to a binary flow turbine scroll valve to reduce surge. The scroll valve is closed to increase turbine energy while the compressor recirculation valve is opened to increase compressor flow. Concurrent adjustments to a wastegate may be used to provide boost pressure control.

20 Claims, 4 Drawing Sheets

(56) References Cited

U.S. PATENT DOCUMENTS

| | | | |
|---|---|---|---|
| 6,079,210 | A | 6/2000 | Pintauro et al. |
| 6,408,833 | B1 | 6/2002 | Faletti |
| 6,565,479 | B2 | 5/2003 | Fattic et al. |
| 6,681,171 | B2 | 1/2004 | Rimnac et al. |
| 6,725,847 | B2 | 4/2004 | Brunemann et al. |
| 6,983,596 | B2 | 1/2006 | Frankenstein et al. |
| 7,137,253 | B2 | 11/2006 | Furman et al. |
| 7,163,005 | B2 | 1/2007 | Tussing et al. |
| 7,640,744 | B2 | 1/2010 | Rollinger et al. |
| 8,161,746 | B2 | 4/2012 | Ulrey et al. |
| 8,267,069 | B2 | 9/2012 | Hsia et al. |
| 8,286,616 | B2 | 10/2012 | Clarke et al. |
| 8,287,233 | B2 | 10/2012 | Chen |
| 8,312,719 | B2 * | 11/2012 | Kong et al. .......... 60/605.1 |
| 8,333,071 | B2 | 12/2012 | Oakley et al. |
| 2006/0196182 | A1 | 9/2006 | Kimoto et al. |
| 2008/0163855 | A1 | 7/2008 | Matthews et al. |
| 2009/0071150 | A1 | 3/2009 | Joergl et al. |
| 2009/0077968 | A1 * | 3/2009 | Sun .................. 60/605.2 |
| 2011/0023842 | A1 | 2/2011 | Kurtz |
| 2011/0094480 | A1 | 4/2011 | Suhocki et al. |
| 2011/0296835 | A1 * | 12/2011 | Ebisu ................. 60/611 |
| 2012/0014812 | A1 | 1/2012 | Blaiklock et al. |
| 2012/0297765 | A1 | 11/2012 | Vigild et al. |
| 2013/0118166 | A1 * | 5/2013 | Bjorge et al. ......... 60/605.2 |
| 2013/0305718 | A1 * | 11/2013 | Rollinger et al. ........ 60/608 |
| 2013/0312406 | A1 * | 11/2013 | Landsmann ............ 60/602 |
| 2014/0130783 | A1 * | 5/2014 | Takaki .............. 123/568.11 |

FOREIGN PATENT DOCUMENTS

| | | | | |
|---|---|---|---|---|
| EP | 1124047 | A1 | 8/2001 | |
| EP | 2426340 | A1 | 3/2012 | |
| EP | 2562397 | A1 | 8/2012 | |
| JP | 08061073 | A * | 3/1996 | ............ F02B 37/10 |
| WO | WO 2012176490 | A1 * | 12/2012 | |

OTHER PUBLICATIONS

Ulrey, Joseph Norman et al., "Methods and Systems for Boost Control," U.S. Appl. No. 13/965,901, filed Aug. 13, 2013, 54 pages.

Ulrey, Joseph Norman et al., "Methods and Systems for Condensation Control," U.S. Appl. No. 13/965,751, filed Aug. 13, 2013, 36 pages.

Styles, Daniel Joseph et al., "Methods and Systems for Boost Control," U.S. Appl. No. 13/965,698, filed Aug. 13, 2013, 43 pages.

Ulrey, Joseph Norman et al., "Methods and Systems for Boost Control, " U.S. Appl. No. 13/965,952, filed August 13, 2013, 40 pages.

Jankovic, Mrdjan J. et al., "Methods and Systems for Boost Control," U.S. Appl. No. 13/829,648, filed Mar. 14, 2013, 39 pages.

Banker, Adam Nathan et al., "Methods and Systems for Torque Control," U.S. Appl. No. 13/965,917, filed Aug. 13, 2013, 46 pages.

Buckland Julia Helen et al., "Methods and Systems for Surge Control," U.S. Appl. No. 113/965,725, filed Aug. 13, 2013, 38 pages.

Ulrey, Joseph Norman et al., "Methods and Systems for Condensation Control," U.S. Appl. No. 13/965,763, filed Aug. 13, 2013, 37 pages.

Ulrey, Joseph Norman et al., "Methods and Systems for EGR Control," U.S. Appl. No. 13/965,794, filed Aug. 13, 2013, 56 pages.

McConville, Gregory Patrick et al., "Methods and Systems for Boost Control," U.S. Appl. No. 13/965,963, filed Aug. 13, 2013, 45 pages.

Ulrey, Joseph Norman et al., "Methods and Systems for EGR Control," U.S. Appl. No. 13/966,006, filed Aug. 13, 2013, 56 pages.

Byrd, Kevin Durand et al., "Multi-Staged Wastegate," U.S. Appl. No. 13/570,025, filed Aug. 8, 2012, 26 pages.

* cited by examiner

METHODS AND SYSTEMS FOR BOOST CONTROL

FIELD

The present application relates to methods and systems for using compressor recirculation flow to improve surge control.

BACKGROUND AND SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. However, compressors are prone to surge. For example, when an operator tips-out of an accelerator pedal, an engine intake throttle closes, leading to reduced forward flow through the compressor, degrading compressor performance, and potentially causing compressor surge. Compressor surge can lead to NVH issues such as undesirable noise from the engine intake system.

One way of addressing compressor surge involves recirculating compressed air across an intake compressor to enable rapid decaying of boost pressure. One example of such an approach is shown by Blaiklock et al. in US 2012/0014812. Therein, a compressor bypass valve (also known as a compressor recirculation valve or CRV) is situated in a passage coupling the compressor outlet to the compressor inlet. The valve is maintained closed during steady-state boosted engine operation and actuated open in response to an indication of surge. By opening the valve, a portion of air discharged from the compressor is recirculated to the compressor inlet, thereby reducing the pressure differential across the compressor and improving compressor flow.

However, the inventors herein have identified potential issues with such an approach. While the recirculation of boosted air across the compressor improves surge margin, more turbine power may be required to drive the recirculation and move the compressor operation out of the surge region than turbine power required to continue operating the compressor without recirculation. Additional turbine power may also be required to maintain the boost pressure. For example, during soft surge conditions, surge may need to be addressed without dropping boost pressure. As such, there may be conditions when the turbine power available is insufficient to drive enough compressor recirculation to move the compressor operating point away from the surge region. Also, the turbine power may not be sufficient to enable the desired boost pressure to be maintained. While the available turbine power can be increased by increasing an exhaust pressure upstream of the turbine (such as by specifying a smaller or more restrictive turbine as part of the turbine matching exercise), increasing the turbine inlet pressure increases the engine pumping work and thereby degrades vehicle fuel economy. In addition, restricting the turbine to achieve better shaft power at low engine power conditions can lead to excessive restriction at high engine power conditions, which may limit the maximum power output of the engine.

The inventors herein have realized that a scroll valve coupled to a binary flow turbine (that is, a turbine having two distinct scrolls or volutes on the turbine inlet) can be advantageously used to change the restriction of the turbine during surge conditions and provide the increased turbine power that is required to drive compressor recirculation flow. The valve may be adjusted to allow exhaust gas to flow to one or both of the scrolls, thereby changing the turbine restriction. For example, when exhaust flows to one scroll, the turbine acts like a smaller turbine producing higher inlet pressure and more shaft power for a given shaft speed. This extra shaft power can be advantageously used to provide the compressor power necessary to flow the additional recirculated air. In comparison, when the exhaust flows to both scrolls, the turbine acts like a larger turbine reducing exhaust pumping work when extra recirculation power is unnecessary, and increasing engine peak power output. In addition, by coordinating the adjustments to the scroll valve position with adjustments to a compressor bypass valve, and/or a wastegate actuator, a surge margin can be improved.

In one example embodiment, compressor surge may be relieved by a method for a boosted engine, comprising: in response to an indication of surge, adjusting each of a first valve located in a passage coupling a compressor outlet to a compressor inlet, and a second valve coupled to an outer scroll (herein also referred to as a secondary scroll) of a multi-scroll exhaust turbine. As such, the turbine may also include a primary scroll inner to the secondary scroll. In this way, a scroll valve may used to provide the turbine power needed to drive increased compressor recirculation via a compressor recirculation valve, the combined approach enabling compressor operation to be shifted out of a surge region.

As an example, a turbocharged engine system may include a compressor driven by a multi-scroll exhaust turbine. A compressor recirculation path may be provided for recirculating a portion of boosted aircharge from downstream of the compressor to the compressor inlet. This may include warm, un-cooled boosted air from downstream of the compressor and upstream of a charge air cooler, or cooled boosted air from downstream of the compressor and downstream of the charge air cooler. An opening of a first compressor recirculation valve (CRV) located in the recirculation path may be increased in response to an indication of surge to increase an amount of compressed air that is recirculated to the compressor inlet. By enabling more recirculation, a boost pressure downstream of the compressor is decreased. The exhaust turbine may include a first, outer scroll and a second, inner scroll. A second scroll valve may be coupled to the outer scroll, but not the inner scroll. An opening of the scroll valve may be adjusted to vary an amount of exhaust gas directed through each of the scrolls. During the surge condition, a turbine power required to drive the recirculation via the first valve while maintaining boost pressure may be determined. An opening of the scroll valve may then be decreased so as to limit exhaust flow through the outer scroll. In doing so, a turbine inlet pressure, and thereby a turbine peak power is increased. The scroll valve adjustment may be adjusted to provide a turbine power that is sufficiently high to drive the recirculation of compressed air via the first valve. A wastegate coupled across the turbine may also be concurrently adjusted to balance shaft power. In particular, the wastegate opening may be decreased to reduce a portion of exhaust gas that is diverted from the turbine inlet to the turbine outlet, thereby increasing a turbine inlet pressure and controlling an engine air flow.

In this way, coordinated adjustments to the position of a scroll valve, a compressor recirculation valve, and a wastegate can be used to address surge while maintaining boost pressure and engine air demand. By using compressor recirculation valve adjustments to improve compressor flow, while using scroll valve adjustments to provide the required turbine power, a margin to surge is improved. By using concurrent wastegate adjustments to maintain turbine inlet conditions within desired limits, better shaft power can be provided to the compressor at low engine power conditions as well as at high engine power conditions, improving engine power output. By coordinating the action of the scroll valve and the compressor recirculation valve, a bigger compressor and a bigger turbine can be used to provide higher boost pressures without incurring frequent surge issues at low engine speeds. Overall, the coordinated approach enables surge margin and boosted engine performance to be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
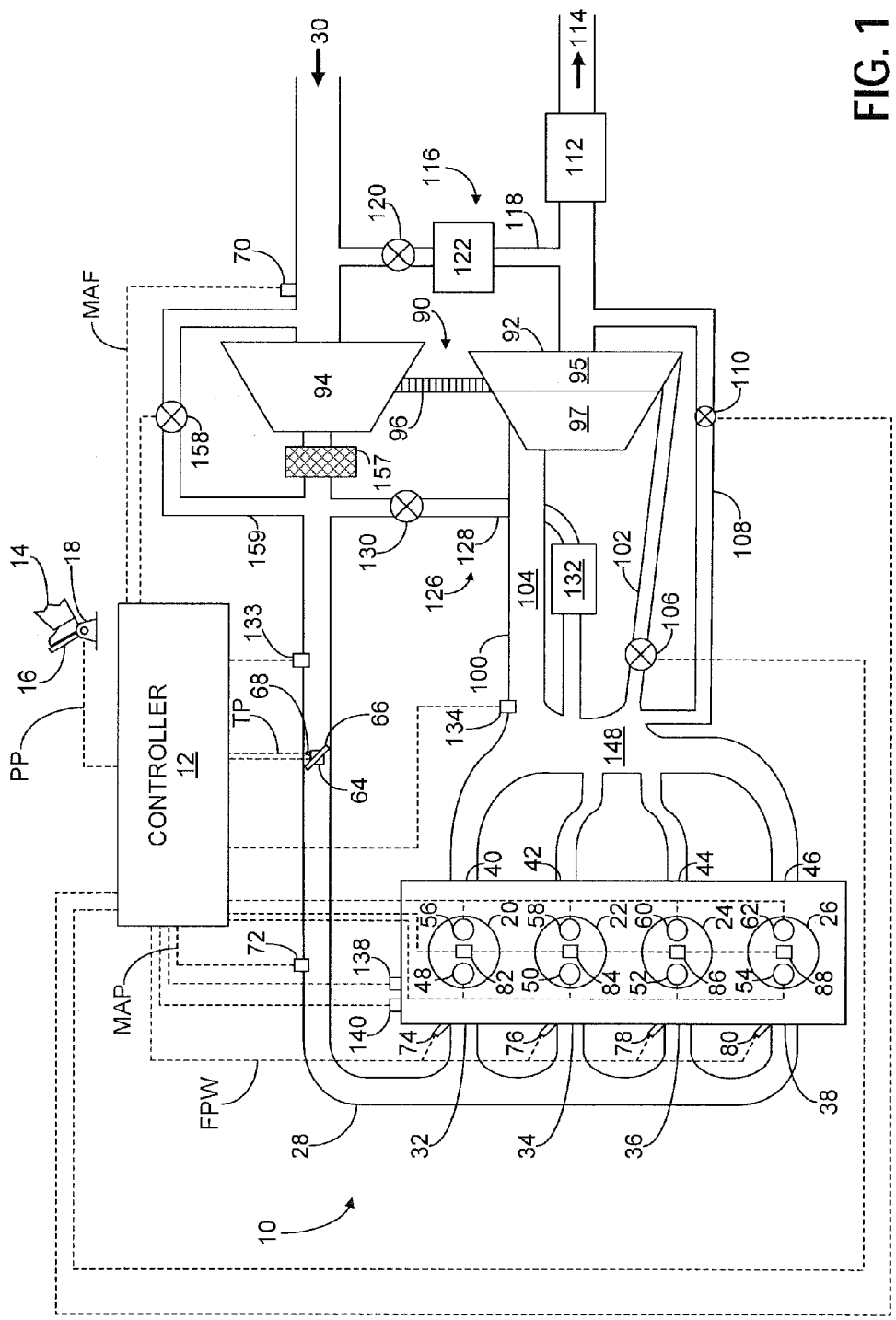
FIG. 1 shows an example of a boosted engine system including a compressor recirculation valve and a binary flow turbine.

The following description relates to systems and methods for addressing compressor surge in a boosted engine system, such as the system of FIG. 1 using a compressor recirculation valve (CRV), a turbine scroll valve, and a wastegate. A controller may be configured to perform a control routine, such as the routine of FIG. 3, to adjust the position of the CRV in response to an indication of surge. The controller may also adjust a position of the scroll valve based on the CRV adjustment, and a position of the wastegate based on the CRV and scroll valve adjustments, to maintain boost pressure while surge is being addressed. The controller may refer to a compressor map, such as the map of FIG. 2, to identify hard and soft surge conditions. Example valve adjustments are described with reference to FIG. 4. In this way, surge is addressed without degrading boosted engine performance.

FIG. 1 shows a schematic diagram of an engine 10, which may be included in a propulsion system of an automobile. Engine 10 may be controlled at least partially by a control system including controller 12 and by input from a vehicle operator 14 via an input device 16. In this example, input device 16 includes an accelerator pedal and a pedal position sensor 18 for generating a proportional pedal position signal PP.

Engine 10 may include a plurality of combustion chambers (i.e., cylinders). In the example shown in FIG. 1, Engine 10 includes combustion chambers 20, 22, 24, and 26, arranged in an inline-4 configuration. It should be understood, however, that though FIG. 1 shows four cylinders, engine 10 may include any number of cylinders in any configuration, e.g., V-6, I-6, V-12, opposed-4, etc.

Though not shown in FIG. 1, each combustion chamber (i.e., cylinder) of engine 10 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 10.

Air is drawn into the engine via air intake passage 30 and then delivered to each combustion chamber along intake manifold 28. Intake manifold 28 may be coupled to the combustion chambers via intake ports. For example, intake manifold 28 is shown in FIG. 1 coupled to cylinders 20, 22, 24, and 26 via intake ports 32, 34, 36, and 38 respectively. Each respective intake port may supply air and/or fuel to the respective cylinder for combustion.

Each combustion chamber may exhaust combustion gases via an exhaust port coupled thereto. For example, exhaust ports 40, 42, 44 and 46, are shown in FIG. 1 coupled to cylinders 20, 22, 24, 26, respectively. Each respective exhaust port may direct exhaust combustion gases from a respective cylinder to an exhaust manifold 148, and from thereon to tailpipe 114.

Each cylinder intake port can selectively communicate with the cylinder via an intake valve. For example, cylinders 20, 22, 24, and 26 are shown in FIG. 1 with intake valves 48, 50, 52, and 54, respectively. Likewise, each cylinder exhaust port can selectively communicate with the cylinder via an exhaust valve. For example, cylinders 20, 22, 24, and 26 are shown in FIG. 1 with exhaust valves 56, 58, 60, and 62, respectively. In some examples, each combustion chamber may include two or more intake valves and/or two or more exhaust valves.

Though not shown in FIG. 1, in some examples, each intake and exhaust valve may be operated by an intake cam and an exhaust cam. Alternatively, one or more of the intake and exhaust valves may be operated by an electromechanically controlled valve coil and armature assembly. The position of an intake cam may be determined by an intake cam sensor. The position of exhaust cam may be determined by an exhaust cam sensor.

Intake passage 30 may include a throttle 64 having a throttle plate 66. In this particular example, the position of throttle plate 66 may be varied by controller 12 via a signal provided to an electric motor or actuator included with throttle 64, a configuration that is commonly referred to as electronic throttle control (ETC). In this manner, throttle 64 may be operated to vary the intake air provided the combustion chambers. The position of throttle plate 66 may be provided to controller 12 by throttle position signal TP from a throttle position sensor 68. Intake passage 30 may include a mass air flow sensor 70 and a manifold air pressure sensor 72 for providing respective signals MAF and MAP to controller 12.

In FIG. 1, fuel injectors are shown coupled directly to the combustion chambers for injecting fuel directly therein in proportion to a pulse width of a signal FPW received from controller 12 via an electronic driver, for example. For example, fuel injectors 74, 76, 78, and 80 are shown in FIG. 1 coupled to cylinders 20, 22, 24, and 26, respectively. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake passage 28 in a configuration that provides what is known as port injection of fuel into the intake ports upstream of the respective combustion chambers. Though not shown in FIG. 1, fuel may be delivered to the fuel injectors by a fuel system including a fuel tank, a fuel pump, a fuel line, and a fuel rail.

The combustion chambers of engine 10 may be operated in a compression ignition mode, with or without an ignition spark. In some examples, a distributorless ignition system (not shown) may provide an ignition sparks to spark plugs coupled to the combustion chambers in response to controller 12. For example, spark plugs 82, 84, 86, and 88 are shown in FIG. 1 coupled to cylinders 20, 22, 24, and 26, respectively.

Engine 10 may include a turbocharger 90. Turbocharger 90 may include an exhaust turbine 92 and an intake compressor 94 coupled on a common shaft 96. The blades of exhaust turbine 92 may be caused to rotate about the common shaft as a portion of the exhaust gas stream discharged from engine 10 impinges upon the blades of the turbine. Intake compressor 94 may be coupled to turbine 92 such that compressor 94 may be actuated when the blades of turbine 92 are caused to rotate. When actuated, compressor 94 may then direct pressurized gas to air intake manifold 28 from where it may then be directed to engine 10. In this way, turbocharger 90 may be configured for providing a boosted aircharge to the engine intake.

Turbocharger 90 may be configured as a multi-scroll turbocharger wherein the exhaust turbine includes a plurality of scrolls. In the depicted embodiment, turbine 92 includes two scrolls including a secondary outer scroll 95 and a primary inner scroll 97. Each scroll may receive exhaust gas from exhaust manifold 148 via distinct inlets. Specifically, exhaust gas may flow along a first exhaust gas entry path 102 into secondary scroll 95 and along a second exhaust gas entry path 104 into primary scroll 97. A scroll valve 106 may be coupled in first exhaust gas entry path 102 between engine exhaust manifold 148 and an inlet of the outer scroll 95. In an alternate embodiment, the scroll control valve may instead be coupled to the second, inner scroll 97. In this way, exhaust turbine 92 is configured as a binary flow turbine. As elaborated below, by adjusting a position of the scroll valve 106, an amount of exhaust gas directed to the turbine can be varied, thereby controlling a turbine inlet pressure and turbine power output. In the depicted example, the scroll valve is not coupled to an inlet of the second inner scroll.

In one example, scroll valve 106 may be on/off valve wherein by opening the valve, exhaust gas flow is directed through each of the inner scroll 97 and outer scroll 95, and wherein by closing the valve, exhaust gas flow through outer scroll 95 is disabled. However, in an alternate embodiment, scroll valve 106 may be a continuously variable scroll valve whose position can be varied to any position between a fully-open position and a fully-closed position to continuously vary a flow of exhaust gas to the outer scroll of the multi-scroll turbine.

A wastegate 110 may be coupled across turbine 92. Specifically, wastegate 110 may be included in a bypass 108 coupled between an inlet and outlet of the exhaust turbine. By opening wastegate 110, exhaust gas pressure can be dumped from the turbine inlet to the turbine outlet, thereby reducing a turbine inlet pressure and turbine power. Controller 12 may adjust the position of wastegate 110 to vary an amount of shaft power provided by the turbine to drive the compressor.

Exhaust gases exiting turbine 92 and/or wastegate 110 may pass through an emission control device 112. Emission control device 112 can include multiple catalyst bricks, in one example. In another example, multiple emission control devices, each with multiple bricks, can be used. In some examples, emission control device 112 may be a three-way type catalyst. In other examples, emission control device 112 may include one or a plurality of a diesel oxidation catalyst (DOC), selective catalytic reduction catalyst (SCR), and a diesel particulate filter (DPF). After passing through emission control device 112, exhaust gas may be directed to a tailpipe 114.

Compressor recirculation valve 158 (CRV) may be provided in a compressor recirculation path 159 around compressor 94 so that air may move from the compressor outlet to the compressor inlet so as to increase airflow through the compressor 94 and reduce surge. A charge air cooler 157 may be positioned in intake passage 30, downstream of compressor 94, for cooling the boosted aircharge delivered to the engine intake. In the depicted example, compressor recirculation path 159 is configured to recirculate cooled compressed air from downstream of charge air cooler 157 to the compressor inlet. In alternate examples, compressor recirculation path 159 may be configured to recirculate compressed air from downstream of the compressor and upstream of charge air cooler 157 to the compressor inlet. An opening of CRV 158 may be adjusted via an electric signal from controller 12.

In the depicted example, compressor recirculation valve 158 may be a continuously variable valve whose position can be continuously adjusted to a fully open position, a fully closed position, or any position there-between. Thus recirculation valve 158 may also be referred to herein as a continuously variable compressor recirculation valve, or CRV 158. In the depicted example, CRV 158 is configured as a throttle valve, although in other embodiments, the CRV may be configured differently (e.g., as a poppet valve). During nominal engine operating conditions, CRV 158 may be kept nominally closed, or nearly closed. In such a position, the valve may be operating with known or negligible leakage. The valve may be opened in response to a hard surge condition to rapidly reduce boost pressure and improve compressor flow. For example, when an operator tips-out of an accelerator pedal, and intake throttle 64 closes to reduce airflow, an increased pressure differential can be created across the compressor. This leads to reduced forward flow through the compressor, degrading turbocharger performance, and possibly causing compressor surge. By fully opening CRV 158 in response to surge (e.g., hard surge), the pressure differential across the compressor is reduced, moving the compressor ratio (or compressor flow) away from a surge limit or surge region. In particular, by increasing an opening of the CRV, a portion of the aircharge compressed by compressor 94 may be dumped from downstream of the compressor to the compressor inlet, allowing additional flow through the compressor. In some embodiments, one or more sensors may be coupled in compressor recirculation passage 159 to determine the mass of recirculated flow delivered from the throttle inlet to the intake passage. The various sensors may include, for example, pressure, temperature, and/or flow sensors.

In an alternate example, CRV 158 may be configured as a three-state valve having a default semi-open position from which it can be moved to a fully-open position or a fully-closed position. The semi-open position may be maintained passively during steady-state boosted engine operating conditions, as well as when operating in a soft surge region. By keeping the valve partially open during such conditions, at least some compressed air may be recirculated from the compressor outlet, upstream or downstream of the charge air cooler, to the compressor inlet, increasing the flow rate through the compressor, and improving the margin to surge. In response to an indication of hard surge, the valve may be actuated to the fully-open position to rapidly reduce boost pressure from downstream of the compressor, thereby improving flow through the compressor. In response to a sudden increase in torque demand, the valve may be actuated to the fully-closed position to rapidly increase boost pressure provided by the compressor, thereby improving engine power output.

In still a further example, CRV 158 may be configured as an on/off valve having a fully-open position or a fully-closed position. The valve may be maintained closed during engine operation and may be actuated open in response to an indication of surge to relieve boost pressure downstream of the compressor.

Figure 2:
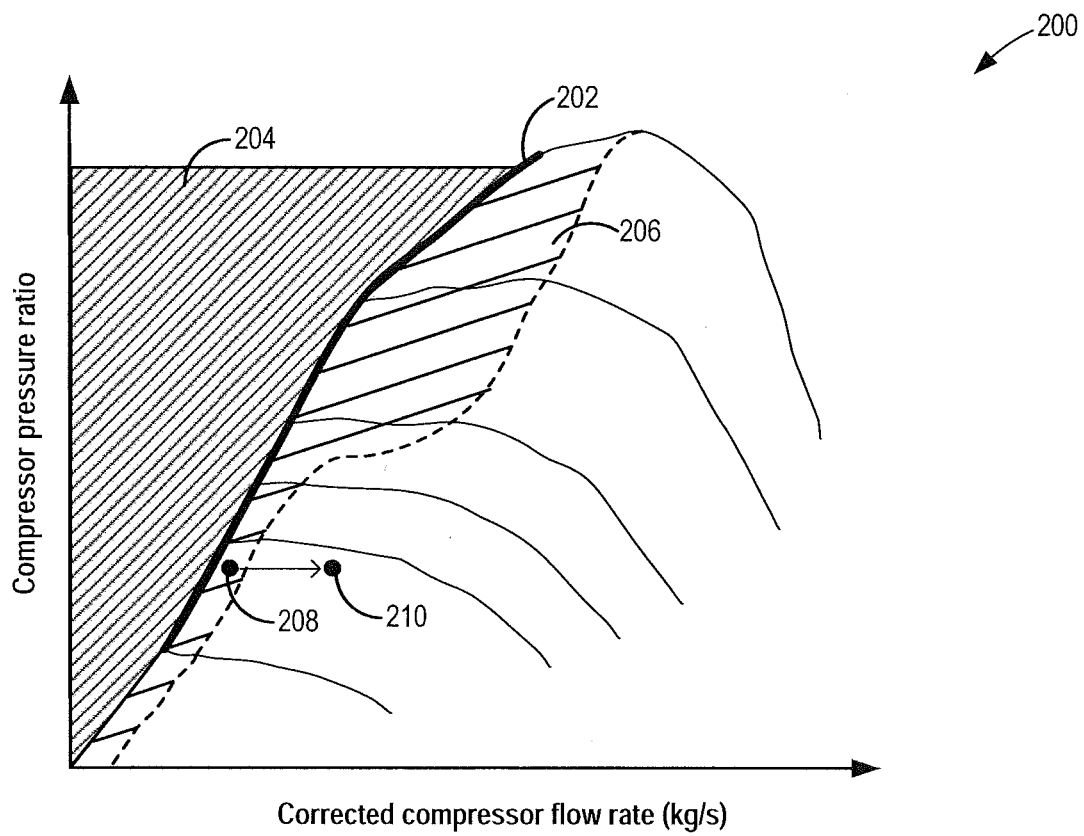
FIG. 2 shows a compressor map displaying hard and soft surge limits.

Engine controller 12 may use a map, such as the map of FIG. 2, to identify whether the compressor is operating in or around a surge region. In particular, map 200 of FIG. 2 shows a change in compressor pressure ratio (along the y-axis) at different compressor flow rates (along the x-axis). Line 202 shows a hard surge line (or hard surge limit) for the given operating conditions. Compressor operation to the left of hard surge line 202 results in operation in a hard surge region 204 (shaded region). As such, compressor operation in hard surge region 204 results in objectionable NVH and potential degradation of engine performance. Hard surge can occur during transient conditions when the engine airflow requirement suddenly decreases, such as during an operator pedal tip-out. This condition typically requires a rapid decrease in compressor outlet pressure or a rapid increase in compressor flow rate to avoid surge. When in this region, an opening of the CRV may be increased (e.g., from a closed position to at least a partially open position, or from a partially-open position to a fully-open position) to move compressor operation away from the hard surge limit 202, specifically, to the right of surge line 202.

For example, the CRV may be opened to move compressor operation immediately to the right of line 202, into shaded region 206, also known as soft surge region 206. Once in soft surge region 206, or to the right of soft region 206, the valve may be returned to the original position (for example, the CRV may be closed or returned to the semi-open position). As such, soft surge can occur during an operator pedal tip-out, or steady-state conditions, where the engine requires maintaining boosted induction pressure. Herein, increasing flow through the compressor without dropping boosted pressure is desired. Thus, by maintaining the CRV at least partially open during these conditions, some increase in airflow is enabled without reducing the boosted pressure below the demand.

While recirculating some of the compressor flow from the higher pressure location downstream of the compressor to the lower pressure location upstream of the compressor can improve the surge margin, more turbine power may be required to operate the compressor with recirculation than without. For example, when the compressor is at operating point 208, inside soft surge region 206, it may be desired to open the compressor recirculation valve and move compressor operation to operating point 210, outside of the soft surge region. Herein, more turbine power is required to operate with compressor recirculation outside the surge region at operating point 210 than is required to operate without compressor recirculation inside the surge region at operating point 208. If sufficient turbine power is not available to drive the recirculation, the engine may continue to operate at undesired operating point 208, or at a lower boost pressure, leading to degraded engine performance and NVH issues. As elaborated herein with reference to FIGS. 3-4, a controller may coordinate the opening of the CRV with the closing of a turbine scroll valve and a turbine wastegate to provide the turbine power required to drive the recirculation, thereby improving the surge margin.

It will be appreciated that while CRV 158 of FIG. 1 is shown recirculating compressor flow from downstream of the compressor to the compressor inlet to increase compressor flow, in alternate embodiments, CRV 158 may be configured to vent a portion of the boosted air to the atmosphere instead of recirculating the air along passage 159.

Returning to FIG. 1, engine 10 may include one or more exhaust gas recirculation (EGR) systems (not shown) for recirculating an amount of exhaust gas exiting engine 10 back to the engine intake. For example, engine 10 may include a low pressure EGR (LP-EGR) system 116 for recirculating a portion of exhaust gas from the exhaust manifold to the intake manifold, specifically, from the engine exhaust, downstream of turbine 92, to the engine intake, upstream of compressor 94. LP-EGR system 116 may include LP-EGR passage 118, LP-EGR valve 120, and LP-EGR cooler 122. Engine 10 may further include a high pressure EGR (HP-EGR) system 126 for recirculating a portion of exhaust gas from the exhaust manifold to the intake manifold, specifically, from the engine exhaust, upstream of turbine 92, to the engine intake, downstream of compressor 94. HP-EGR system 126 may include HP-EGR passage 128, HP-EGR valve 130, and HP-EGR cooler 132. Under some conditions, one or more of EGR systems 116 and 126 may be used to regulate the temperature and or dilution of the air and fuel mixture within the combustion chambers, thus providing a method of controlling the timing of ignition during some combustion modes. Further, during some conditions, a portion of combustion gases may be retained or trapped in the combustion chamber by controlling exhaust valve timing.

In some examples, controller 12 may be a conventional microcomputer including: a microprocessor unit, input/output ports, read-only memory, random access memory, keep alive memory, and a conventional data bus. Controller 12 is shown in FIG. 1 receiving various signals from sensors coupled to engine 10, in addition to those signals previously discussed, including: engine coolant temperature (ECT) from a temperature sensor 138; an engine position sensor 140, e.g., a Hall effect sensor sensing crankshaft position. Barometric pressure may also be sensed (sensor not shown) for processing by controller 12. In some examples, engine position sensor 140 produces a predetermined number of equally spaced pulses every revolution of the crankshaft from which engine speed (RPM) can be determined. Additionally, various sensors may be employed to determine turbocharger boost pressure. For example, a pressure sensor 133 may be disposed in the engine intake downstream of compressor 94 to determine boost pressure. Additionally, at least the exhaust passage routing exhaust to inner scroll 97 may include various sensors for monitoring operating conditions of the multi-scroll turbocharger, such as an exhaust gas sensor 134. Exhaust gas sensor 134 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Based on the input from the various sensors, controller 12 may be configured to perform various control routines (such as those described with reference to FIG. 3) and actuate one or more engine actuators. The actuators may include, for example, intake throttle 64, CRV 158, wastegate 110, scroll valve 106, and fuel injectors 74-80.

As such, by adjusting an opening of scroll valve 106 based on engine operating conditions, the turbine may be operated in different modes, and the dynamic range over which boost can be provided by the turbocharger is enhanced. For example, the turbocharger may be operated in a first mode with the scroll valve closed (e.g., fully closed) during selected conditions, such as at low engine speeds, during engine cold-starts, and in response to an increased demand for torque. When operating in the first mode with the scroll valve closed, the turbine behaves like a small mono-scroll turbine, providing faster spin-up and BMEP. Herein, the closing of the scroll shuts off exhaust flow to the first scroll. The resulting limited flow of exhaust, through only one of the scrolls, increases exhaust manifold pressure and turbine inlet pressure (and engine backpressure). By raising the pressure of exhaust flowing through the turbine, turbine speed and power are increased, particularly when the engine is operating at low speeds and during transient maneuvers. When coordinated with adjustments to the wastegate, as well as one or both EGR systems (to provide cooled EGR benefits), the time to desired torque and turbine spin-up can be substantially improved.

As another example, the turbocharger may be operated in a second mode with the scroll valve open (e.g., fully open) during selected conditions. When operating in the second mode with the scroll valve open, the turbine behaves like a large mono-scroll turbine, providing improved peak power. Herein, the opening of the scroll causes exhaust to flow through both the first and second scroll. The resulting drop in exhaust manifold pressure allows more fresh air to be drawn into the engine cylinder during the intake stroke. The increased flow of exhaust through the turbine also increases the driving of the turbine. When coordinated with adjustments to the wastegate, and the CRV, boosted engine performance and a margin to surge are improved. Example scroll valve adjustments performed during compressor surge in coordination with wastegate adjustments and CRV adjustments are described with reference to the routine of FIG. 3 and with reference to the example of FIG. 4.

While the above modes describe the scroll valve as being either fully open or fully closed, it will be appreciated that in still other modes, the scroll valve may be adjusted to any (variable) position between the fully open and fully closed states, based on engine operating conditions. For example, based on engine operating conditions, the scroll valve may be opened or closed incrementally (e.g., in 20% increments).

Figure 3:
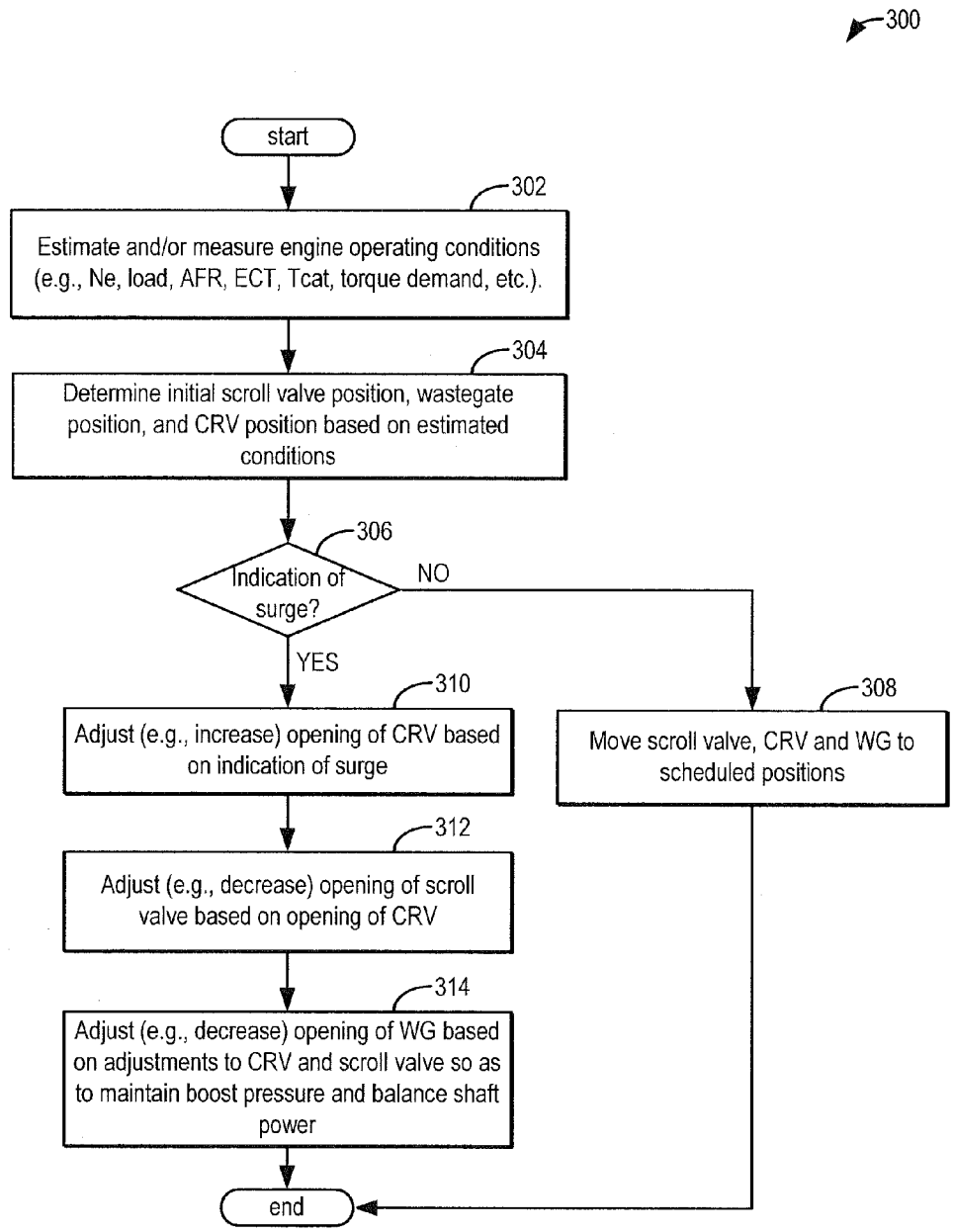
FIG. 3 shows a high level flow chart illustrating a routine that may be implemented for adjusting the position of a compressor recirculation valve, a wastegate valve, and a scroll valve of the binary flow turbine in response to an indication of surge.

Now turning to FIG. 3, an example routine 300 is shown for coordinating adjustments to the position of each of a first compressor recirculation valve (such as valve 158 of FIG. 1), a second scroll valve (such as valve 106 of FIG. 1), and a third wastegate valve (such as valve 110 of FIG. 1) to reduce compressor surge while maintaining boost pressure provided to the engine. The method improves boosted engine performance and a margin to surge.

At 302, the routine includes estimating and/or measuring engine operating conditions. The conditions estimated may include, for example, engine speed, torque demand, engine load, engine temperature, exhaust catalyst temperature, exhaust air-fuel ratio, boost demand, etc.

At 304, based on the estimated operating conditions, initial positions and settings may be determined for each of a first valve located in a passage coupling a compressor outlet to a compressor inlet (that is, a first compressor recirculation valve), a second valve coupled to an outer scroll of a multi-scroll exhaust turbine (that is, a second scroll valve), and a third valve in a bypass coupled across the turbine (that is, a third wastegate valve). For example, to meet the driver torque demand, the engine may be operated with boost, and during the boosted engine operation, the scroll valve may be kept open to increase exhaust flow through both scrolls of the turbine (thereby reducing turbine inlet pressure and engine pumping work), and the compressor recirculation valve may be kept closed to reduce turbocharger shaft work, or partially open to provide some margin to surge. In addition, the wastegate may be kept partially open or closed to provide the required boost pressure while maintaining turbine inlet pressures and temperatures to be within defined limits.

As such, based on the configuration of the first compressor recirculation valve, the default position of the valve during steady-state engine operating conditions may vary. For example, if the first valve is configured as an on/off type of compressor recirculation valve, the first valve may be held in the fully-closed position during regular boosted engine operation. In comparison, if the first valve is configured as a three-state compressor recirculation valve, the first valve may be held in a semi-open position during steady-state boosted engine operation. Further still, if the first valve is configured as a continuously variable valve, the first valve may be held in a fully-closed or a partially open position during steady-state boost engine operation.

At 306, it may be determined if there is an indication of surge. In one example, an indication of surge may be confirmed during an operator pedal tip-out. As another example, an indication of surge may be confirmed based on a compressor flow rate relative to a boost induction pressure (or compressor pressure ratio). The controller may estimate a compressor ratio and compare it to a threshold on a compressor map to determine if the compressor is operating with surge in a hard surge region or soft surge region. For example, if the compressor is operating to the left of surge line 202 of FIG. 2, and in surge region 204, hard surge may be confirmed. It will be appreciated that the control system may also adjust the valves in anticipation of surge to avoid surge before it starts rather than to allow surge to happen before reacting to it.

If surge is not confirmed, then at 308, the routine proceeds to move the scroll valve, the compressor recirculation valve, and the wastegate valve to their scheduled positions. Further, the controller may hold the valves in their scheduled positions until a change in position is requested due to a change in engine operating conditions.

If surge is confirmed, then at 310, the routine includes, in response to the indication of surge, adjusting the first valve located in the passage coupling the compressor outlet to the compressor inlet. The adjusting of the first valve may be based on the indication of surge. For example, the adjusting of the first valve may include increasing an opening of the first valve as the indication of surge increases. In one example, where the first valve is an on/off (or open/close) type compressor recirculation valve, increasing an opening of the first valve may include shifting the valve from the fully-closed position (off position) to the fully-open position (on position). In another example, where the first valve is a three-state compressor recirculation valve, increasing an opening of the first valve may include shifting the valve from the fully-closed position (off position) to the fully-open position (on position), or from a partially-open position to a fully-open position or from a fully-closed position to a partially-open position. In still another example, where the first valve is a continuously variable valve whose position is continuously variable between a fully-open position and a fully-closed position, increasing an opening of the first valve may include shifting the valve from a fully-closed position to a fully-open position, or from a partially-open position to a fully-open position or from a fully-closed position to a partially-open position, or from a partially open position to another partially open position. By increasing an opening of the first valve, recirculation of compressed air from the compressor outlet to the compressor inlet is increased. This increases flow through the compressor moving the compressor out of the surge region (e.g., to the right of surge line 202 of FIG. 2).

It will be appreciated that in an alternate example, the CRV may be opened to vent a portion of the boosted air to the atmosphere instead of recirculating the air along the recirculation passage to the compressor inlet.

At 312, the routine includes adjusting the second valve coupled to the outer scroll of the multi-scroll exhaust turbine. The adjusting of the second valve may be based on the adjusting of the first valve. For example, the adjusting of the second valve may include closing the second valve, wherein a degree and/or timing of the closing of the second valve is based on the increasing an opening of the first valve. In particular, the controller may determine a turbine power required to move the compressor out of the surge region via the recirculation and adjust the closing of the second valve to provide the required turbine power. For example, the controller may determine a turbine power associated with (e.g., required for) the increasing an opening of the first valve (at 310). The controller may then determine an amount of turbine power available with the scroll valve at the nominal position. If additional turbine power is required, the opening of the scroll valve may be decreased (or a degree of closing of the second valve may be increased) based on the difference between the available turbine power and the turbine power required to drive the compressor recirculation through the CRV. In further embodiments, a timing of closing the second valve may be adjusted to be staggered or coincident with the opening of the first valve. For example, as the first valve opening is increased, an opening of the second valve may be decreased. By closing the second valve, flow of exhaust gas to the secondary scroll of the turbine is disabled and only flow of exhaust gas to the (inner) primary scroll of the turbine is enabled. This increases the turbine inlet pressure and increases the turbine power available.

In one example, the scroll valve may be an on/off valve and closing the valve may include shifting the valve from the fully-open position to the fully-closed position. However, in alternate examples, the scroll valve may be a continuously variable scroll valve whose position can be varied to any position between a fully-open position and a fully-closed position to continuously vary a flow of exhaust gas to the outer scroll of the multi-scroll turbine. Herein, in response to the indication of surge, the opening of the scroll valve may be decreased based on the opening of the CRV to decrease flow of exhaust gas through the (outer) secondary scroll while maintaining flow of exhaust gas through the primary scroll of the turbine. As such, this may provide a turbine restriction required to provide the necessary turbine power for driving the compressor recirculation flow in response to the indication of surge.

In addition, during selected surge conditions (such as during soft surge), the engine may require maintaining of boosted induction pressure. Herein, increasing flow through the compressor without dropping boosted pressure is desired. While the opening of the first valve addresses the increasing of flow through the compressor, it may result in a drop in boost pressure. During these conditions, the closing of the second valve may be further adjusted based on the opening of the first valve and the boost demand to compensate for the drop in boost pressure resulting from the opening of the first valve. Specifically, by closing the scroll valve, a turbine inlet pressure is increased to provide additional turbine power to maintain the boost pressure while addressing the surge.

At 314, the routine includes adjusting a wastegate coupled across the turbine based on each of the adjusting of the first valve and the adjusting of the second valve. The wastegate adjustment may be used to maintain a desired engine boost pressure and a desired engine air flow. Specifically, the wastegate may be adjusted to provide the desired boost pressure in the presence of recirculation flow as allowed by the CRV. Both the second valve and the third valve have the ability to increase turbine inlet pressure and turbine power when moved toward the closed position. If the second valve is an on/off valve, it could be used for large adjustments, while the third valve, being a continuously variable valve, could be used for finer adjustments. Adjusting the wastegate may include reducing an opening of the wastegate in response to increasing an opening of the first valve and the closing of the second valve. For example, the wastegate may be closed to compensate for the drop in boost pressure resulting from the opening of the first compressor recirculation valve and to supplement the increase in turbine energy achieved by closing scroll valve. In addition, the wastegate adjustment balances the shaft power provided to the compressor from the turbine. Under some engine operating conditions, the second valve may not be adjusted due to the opening of the first valve, but the third valve may be closed due to the opening of the first valve. For instance, if the second valve is fully opened and the wastegate valve is partly opened, increasing the opening in the first valve to avoid soft surge may require an increase in turbine power. The increase in turbine power may be achieved by decreasing the opening of the third valve, while maintaining the second valve in the open position.

The adjusting of the wastegate may be further based on one or more of a turbine inlet temperature and a turbine inlet pressure. For example, the wastegate closing may be adjusted to maintain the turbine inlet temperature and a turbine inlet pressure within a predefined range as well as to reduce boost overshoot. If there is an indication that turbine inlet temperature is above a predefined threshold and cannot be reduced by adjustment to other control factors, the wastegate may be opened to reduce the turbine inlet pressure, which also tends to reduce turbine inlet temperature. Doing so will reduce turbine power, which will tend to decrease boost pressure if no other adjustments are made.

In this way, a coordinated approach to address surge is provided that allows a surge margin to be improved. By using adjustments to a wastegate and a scroll valve along with adjustments to a compressor recirculation valve, more turbine power is provided to drive the additional recirculated flow through the compressor to address surge.

Generally, various compromises have to be made when configuring a turbocharger system for an engine (also known as turbo matching where a turbocharger is selected to match an engine). The competing constraints include: the compressor needs to be large enough to achieve peak engine power, but small enough to allow high pressure ratios at low engine air flow rates to provide good torque output at low engine speeds. Likewise, the turbine needs to be large enough to enable high engine power to be achieved with low restriction and low pumping work, but small enough to provide shaft power to the compressor at all operating conditions. Then, a wastegate may be used to reduce turbine inlet pressure and balance the available shaft power to that required by the compressor to deliver the requested boost pressure. By coordinating the adjustments to a compressor recirculation valve with adjustments to a wastegate and a turbine scroll valve, as discussed with reference to the routine of FIG. 3, various advantages are achieved. First, the turbo matching can be done differently, leaning towards the use of a bigger turbine and a bigger compressor. Use of the CRV allows a large compressor to provide higher boost pressure at low engine air flow rates without surging. Use of the binary flow turbine scroll valve allows a large turbine to provide sufficient shaft power to power the compressor under conditions when the CRV is recirculating air. The wastegate can then be used to reduce pumping work and balance shaft power.

Figure 4:
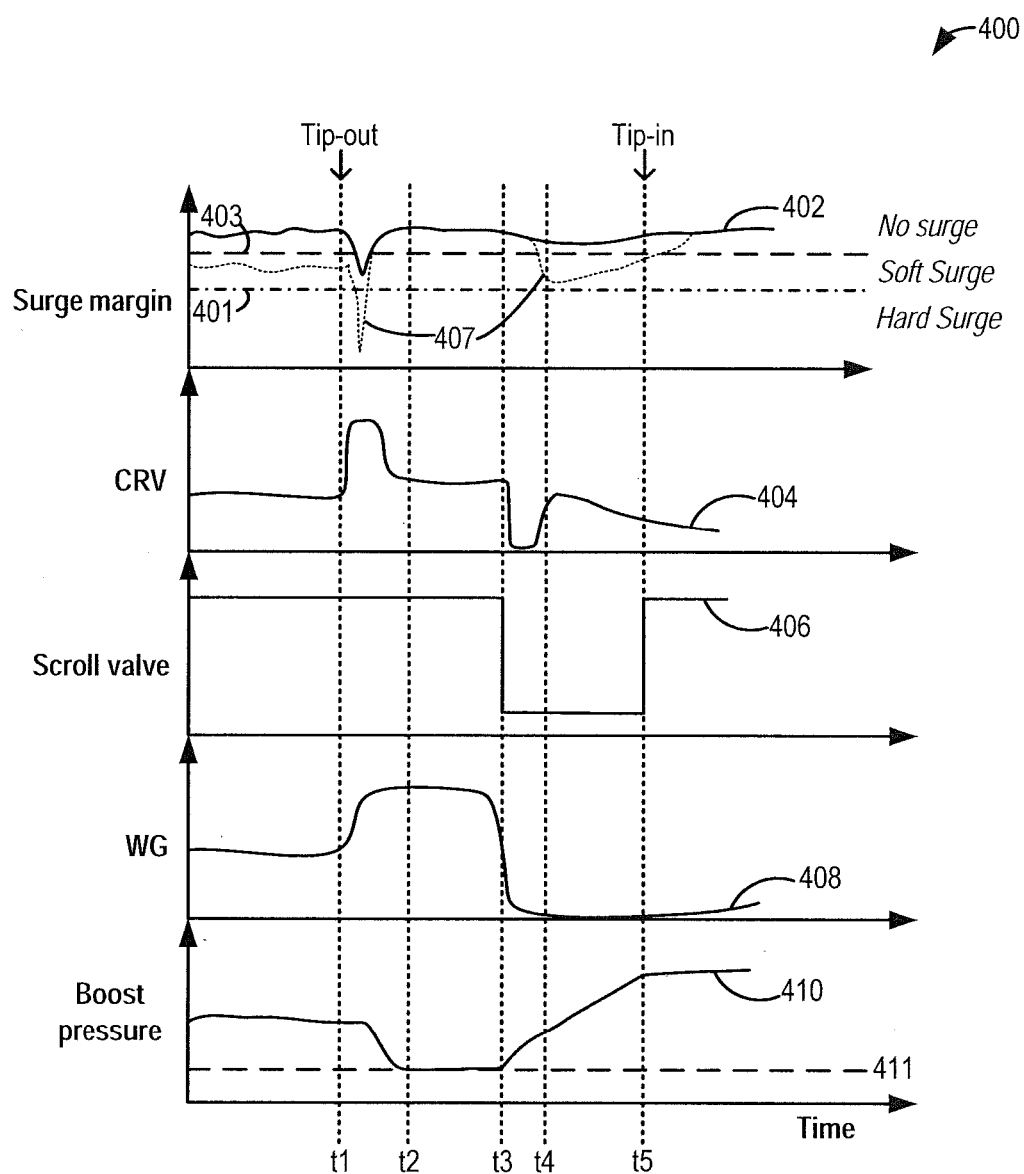
FIG. 4 shows an example coordination of valve adjustments during surge, according to the present disclosure.

Example adjustments to each of a wastegate, a compressor recirculation valve (CRV), and a scroll valve during a surge condition are now elaborated with reference to the example of FIG. 4. Specifically, map 400 of FIG. 4 depicts surge margin at plot 402, CRV adjustments at plot 404, scroll valve adjustments at plot 406, wastegate adjustments at plot 408, and resulting changes to boost pressure at plot 410.

Prior to t1, the engine may be operating boosted (plot 410). The desired boost pressure may be provided by operating a compressor while holding the scroll valve open (plot 406) and the wastegate (plot 408) partially open. In addition, the CRV may be held in a partially-open position (plot 404) to recirculate at least some compressed air during steady-state boosted operating conditions so as to improve a surge margin. Specifically, by holding the CRV partially open before t1, the surge margin (plot 402) can be increased to move away from the soft surge region between lines 401 and 403. The dashed line represents the surge margin that would have resulted if the CRV were held fully closed. However, in alternate examples, such as at higher engine speeds, the CRV may be held closed during the boosted engine operation to allow higher boost pressures to be attained.

At t1, an operator pedal tip-out event may occur. In response to the tip-out, an intake throttle may be closed (not shown) to rapidly reduce airflow to the engine. However, due to the sudden closing of the throttle, the airflow through the compressor may decrease, causing the compressor operating point to move into a surge region. Specifically, the compressor airflow may reduce enough to move into the hard surge region (204 of FIG. 2).

In response to the indication of compressor surge, at t1, an engine controller may adjust the CRV to increase recirculation of compressed air from downstream of the compressor to a compressor inlet. An opening of the CRV is increased based on an indication of the surge to increase a compressor flow rate. In the depicted example, increasing the opening of the CRV includes shifting the valve from a first, semi-open position to a second, fully-open position. However, in alternate examples, where the CRV is held closed prior to the tip-out, at the tip-out, the CRV may be shifted to, or towards, a fully-open position.

In one example, the opening of the CRV is increased to increase recirculation of cooled compressed air from downstream of the compressor and downstream of a charge air cooler to the compressor inlet. In another example, the opening of the CRV may be increased to increase recirculation of warm (un-cooled) compressed air from downstream of the compressor and upstream of the charge air cooler to the compressor inlet. In still other examples, where the compressor outlet is coupled to the compressor inlet via a first passage downstream of the charge air cooler and a second passage upstream of the charge air cooler, the controller may adjust a common CRV (or distinct CRVs in each passage) to increase a total amount of compressor recirculation flow while varying a proportion of compressed air recirculated from upstream and downstream of the charge air cooler to provide a temperature-controlled compressed air flow to the compressor inlet. Herein, a larger proportion of warm compressed air may be used during some surge conditions to rapidly address surge due to the shorter length of the second passage. During other surge conditions, a larger proportion of cooled compressed air may be used to reduce a temperature amplification effect that may occur when warm compressor recirculation flow is redirected and re-boosted through the compressor.

Also at t1, due to the tipout, there is no demand for boosted air, so the scroll valve can remain open and the wastegate can be further opened in order to reduce exhaust pressure and pumping work At t2, in response to the opening of the CRV, the surge margin may move out of a hard surge region (below hard surge limit 401) and move into a soft surge region (between hard surge limit 401 and soft surge limit 403). As such, this may correspond to a shift in the compressor operating point from the left of hard surge line 202 of FIG. 2 into region 206, to the right of surge line 202. Once out of the hard surge region, the CRV opening may be decreased. For example, the CRV may be returned to the semi-open state. By reducing the opening of the CRV once the surge margin is out of the hard surge region, energy consumption involved in maintaining the CRV open may be reduced.

Between t1 and t2, the controller may also adjust the position of a wastegate coupled across the turbine based on the adjustments to each of the first and second valve. The wastegate may be adjusted from a partially open condition that provided the desired boost level prior to t1 to a fully open position to reduce turbine inlet pressure at t1. The reduced inlet pressure would lead to lower engine pumping work. In an alternate scenario, the wastegate could be moved to the closed position in order to maintain turbo speed during the tipout. This may be done in order to improve transient torque response time during a subsequent tip-in.

Between t2 and t3, the boost pressure may be reduced in response to a reduced torque demand. During this time, the intake manifold pressure may be lower than atmospheric pressure, so no boost is required. The wastegate may remain open, and the scroll valve open to minimize turbine power and pumping work. The CRV may remain open to provide an alternate forward path for air to bypass the compressor.

At t3, an operator pedal tip-in event may occur. In response to the tip-in, there may be a sudden increase in torque, engine airflow and boost pressure demand. To meet the demand, the CRV opening may be decreased. For example, the CRV may be shifted from the semi-open position to a fully-closed position. Alternatively, the CRV may be moved to or towards a fully-open position. In addition, the scroll valve may be closed. This allows exhaust gas to flow only through the inner scroll, increasing turbine inlet pressure and allowing the turbine to spin-up faster. At t5, when the boost pressure has increased above a threshold, the scroll valve may be opened to allow exhaust gas to flow through both the inner and outer scroll of the turbine, allowing turbine peak power to be increased. By maximizing the turbine energy, the boost demand can be met, and transient torque response is improved.

Between t3 and t4, the wastegate may be held in the fully closed position in order to maximize the turbine inlet pressure and increase turbo speed quickly. Starting at t4, the CRV may move from the fully closed position to the partially open position to avoid soft surge as the boost pressure increases. While the boost pressure is increasing, the airflow demanded by the engine may also be increasing as the engine speed increases. Surge margin is based on the total airflow through the compressor, which is comprised of the airflow to the engine and the recirculated airflow. As airflow to the engine increases, recirculation airflow can be reduced by closing the CRV, while maintaining the desired surge margin. This continues after t5 as the engine airflow continues to increase.

Between t4 and t5, the wastegate opening may be adjusted to meet the increased engine air demand and balance the available shaft power to that required by the compressor to meet the boost demand. Specifically, between t4 and t5, the scroll valve and the wastegate remain closed to provide the maximum power to the turbine. This allows turbine speed and boost pressure to increase as quickly as possible, even in the presence of the additional compressor flow due to the CRV opening. At t5, the exhaust pressure and flow may be high enough that it becomes too restrictive to keep the scroll valve closed. The scroll valve opens, but the wastegate initially remains closed to continue increasing turbo speed and boost. Some time after t5, the desired boost pressure may be reached, and the wastegate is opened to maintain the desired boost level.

In this way, a CRV may be opened to provide a surge margin while a scroll valve is closed to provide additional turbine energy. Concurrently, a wastegate is adjusted to control boost to meet air demand. Likewise, during transients, the scroll valve and the wastegate are closed to maximize turbine energy for transient boost response. Concurrently, the CRV is adjusted to manage surge margin while the turbocharger spins up.

In one example, an engine system comprises an engine and a turbocharger. The turbocharger may include a compressor driven by a multi-scroll turbine. A charge air cooler may be located downstream of the compressor for cooling a boosted aircharge delivered to the engine. A compressor recirculation passage including a first valve may couple an outlet of the charge air cooler to an inlet of the compressor. A wastegate may couple a turbine outlet to a turbine inlet. A second valve may be coupled to an inlet of an outer scroll of the multi-scroll exhaust turbine. A controller may be configured with computer readable instructions for operating the engine boosted with the first valve partially open and the second valve fully open. In response to an indication of surge, the controller may increase an opening of the first valve based on the indication of surge and decrease an opening of the second valve based on the opening of the first valve. Decreasing the opening of the second valve based on the opening of the first valve may include estimating a turbine power required to enable compressor recirculation flow at the opening of the first valve, and decreasing an opening of the second valve to provide a turbine inlet pressure that provides the estimated turbine power. The controller may include further instructions for, while increasing the opening of the first valve and decreasing the opening of the second valve, adjusting a position of the wastegate based on adjustments to each of the first and second valve to maintain boost pressure. The adjusting may include decreasing an opening of the wastegate as the opening of the first valve is increased and the opening of the second valve is decreased. The adjusting of a position of the wastegate may be further based on one or more of a turbine inlet temperature and a turbine inlet pressure.

In this way, each of a compressor recirculation valve, a turbine scroll valve, and a turbine wastegate may be actuated in coordination to manage compressor and turbine states to better address a compressor surge condition. In particular, while the CRV is used to reduce surge, and improve surge margins, the scroll valve can be used to provide sufficient turbine power to operate the compressor with the required amount of recirculation to address the surge. At the same time, the wastegate can be adjusted to provide the desired engine airflow and maintain the turbine inlet temperature and pressure within limits. In addition, the wastegate adjustments can be used to maintain a boost induction pressure while maintaining turbocharger operation within speed limits and reduce boost overshoot. Overall, surge margin is improved and NVH and driveability concerns associated with compressor surge are reduced. Also, transient boost performance is improved.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a boosted engine, comprising:
   in response to an indication of surge from one or more sensors, adjusting compressor flow by adjusting, via a controller, each of a first actuator of a first valve located in a passage coupling a compressor outlet to a compressor inlet, and a second actuator of a second valve coupled to an outer, secondary scroll of a multi-scroll exhaust turbine.

2. The method of claim 1, wherein the adjusting of the first valve is based on the indication of surge, and wherein the adjusting of the second valve is based on the adjusting of the first valve.

3. The method of claim 2, wherein the adjusting of the first valve includes increasing an opening of the first valve as the indication of surge increases.

4. The method of claim 3, wherein the first valve is a continuously variable valve whose position is continuously variable between a fully-open position and a fully-closed position, and wherein the passage couples the compressor outlet downstream of a charge air cooler to the compressor inlet.

5. The method of claim 4, wherein the adjusting of the second valve includes closing the second valve, a timing and/or degree of the closing based on the increasing an opening of the first valve.

6. The method of claim 5, wherein increasing an opening of the first valve includes increasing the opening to increase recirculation of compressed air from the compressor outlet to the compressor inlet, and wherein closing the second valve includes closing the second valve to disable flow of exhaust gas to the outer, secondary scroll of the turbine.

7. The method of claim 6, further comprising adjusting a wastegate coupled across the turbine based on each of the adjusting of the first valve and the adjusting of the second valve to maintain a desired engine boost pressure.

8. The method of claim 7, wherein adjusting the wastegate includes reducing an opening of the wastegate in response to the increasing an opening of the first valve and the closing of the second valve.

9. The method of claim 8, wherein the adjusting of the wastegate is further based on one or more of engine boost pressure, a turbine inlet temperature, a turbine inlet pressure, and an engine air demand.

10. A method for controlling an engine, comprising:
in response to surge indicated by one or more sensors,
adjusting a first actuator via a controller to adjust a first valve to increase recirculation of compressed air to a compressor inlet;
adjusting a second actuator via the controller to adjust a second valve coupled to an outer scroll of a multi-scroll turbine based on the adjusting of the first valve; and
adjusting a third actuator via the controller to adjust a wastegate coupled across the turbine based on the adjustments to each of the first and second valves.

11. The method of claim 10, wherein adjusting the first valve to increase recirculation of compressed air to a compressor inlet includes increasing an opening of the first valve to increase recirculation of cooled compressed air from downstream of the compressor and downstream of a charge air cooler to the compressor inlet.

12. The method of claim 10, wherein adjusting the first valve includes increasing an opening of the first valve based on an indication of the surge to increase a compressor flow rate.

13. The method of claim 12, wherein increasing an opening of the first valve includes shifting the first valve from a first, semi-open position to a second, fully-open position.

14. The method of claim 12, wherein adjusting the second valve includes decreasing an opening of the second valve based on the increasing of the opening of the first valve to increase a turbine inlet pressure.

15. The method of claim 14, wherein adjusting the wastegate includes adjusting the wastegate based on the adjustments to each of the first and second valves to maintain a desired boost pressure.

16. The method of claim 14, wherein the turbine further includes an inner scroll, the second valve not coupled to the inner scroll, and wherein decreasing an opening of the second valve includes fully closing the second valve to limit flow of exhaust gas through the outer scroll while enabling flow of exhaust gas through the inner scroll.

17. An engine system, comprising:
an engine;
a turbocharger including a compressor driven by a multi-scroll turbine;
a charge air cooler located downstream of the compressor for cooling a boosted aircharge delivered to the engine;
a compressor recirculation passage including a first valve coupling an outlet of the charge air cooler to an inlet of the compressor;
a wastegate coupling a turbine outlet to a turbine inlet;
a second valve coupled to an inlet of an outer scroll of the turbine; and
a controller with computer readable instructions for:
operating the engine boosted with the first valve partially open and the second valve fully open; and
in response to an indication of surge, increasing an opening of the first valve based on the indication and decreasing an opening of the second valve based on the opening of the first valve.

18. The system of claim 17, wherein decreasing an opening of the second valve based on the opening of the first valve includes estimating a turbine power required to enable compressor recirculation flow at the opening of the first valve, and decreasing an opening of the second valve to provide a turbine inlet pressure that provides the estimated turbine power.

19. The system of claim 17, wherein the controller includes further instructions for,
while increasing the opening of the first valve and decreasing the opening of the second valve, adjusting a position of the wastegate based on adjustments to each of the first and second valves to maintain a turbine inlet pressure.

20. The system of claim 19, wherein the adjusting includes decreasing an opening of the wastegate as the opening of the first valve is increased and the opening of the second valve is decreased.

* * * * *